May 4, 1943.  S. SEGAL  2,318,123
FASTENER
Filed May 21, 1942
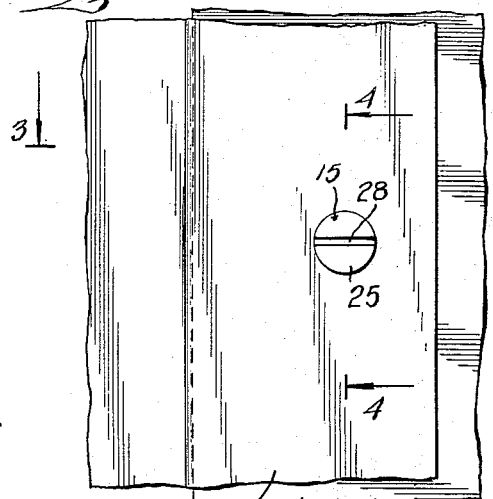
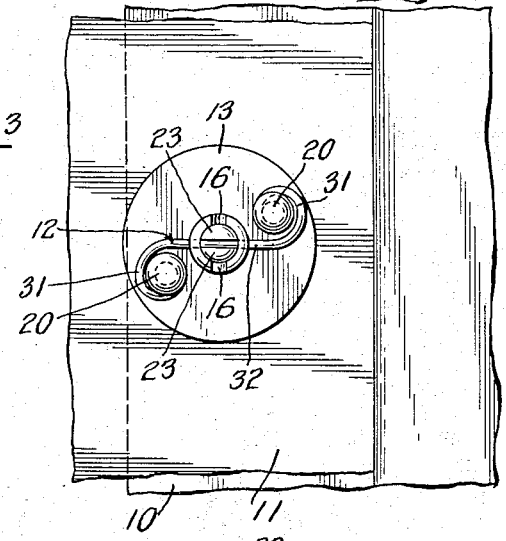
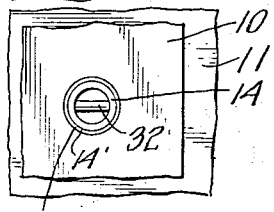
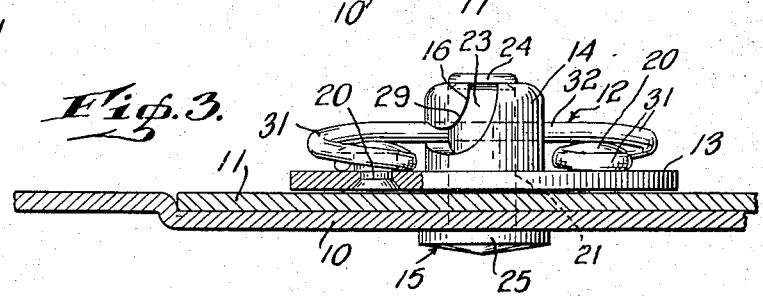
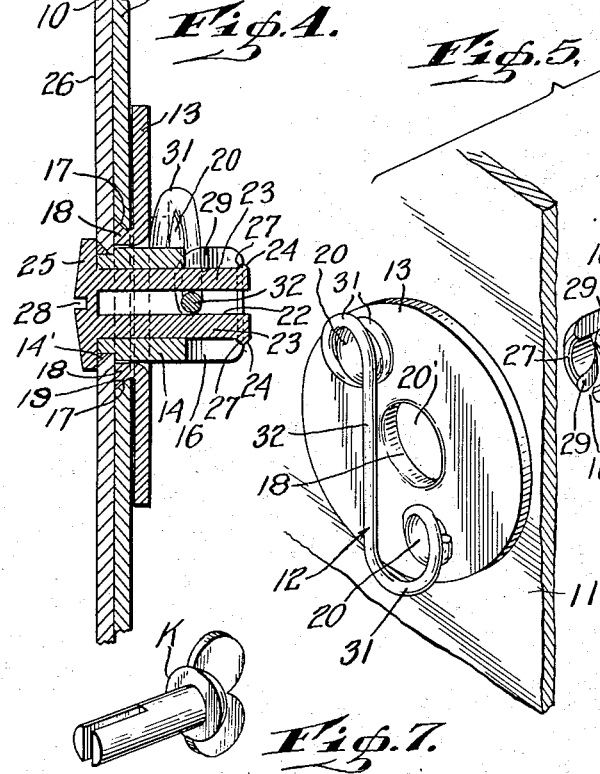
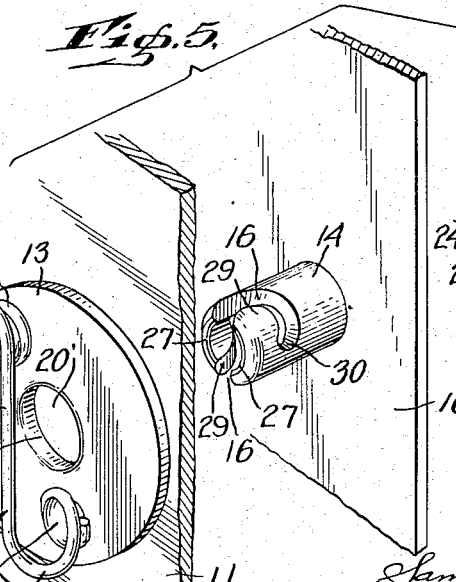
Samuel Segal
INVENTOR
BY
ATTORNEY Patented May 4, 1943

2,318,123

UNITED STATES PATENT OFFICE 2,318,123

FASTENER

Samuel Segal, Brooklyn, N. Y.

Application May 21, 1942, Serial No. 443,953

13 Claims. (Cl. 24—221)

This invention is a fastener for disconnectably holding and clamping contiguous plates firmly together and the object of the invention is to provide a novel and serviceable fastener wherein driving means in the form of a slotted stud is utilized to straddle and rotatably drive a spring disposed adjacent and traversing an opening of one of the plates to removably interlock with spaced cams of a slotted bearing fixedly carried by a companion cover plate. Another aspect and further object of the invention contemplates the employment of an inner plate having a rotatable disc carrying a yieldable and resilient spring adapted to be driven into interlocking relation with a fixed but slotted bearing or socket of an outer plate upon rotation of the slotted stud relative to the bearing to removably clamp the inner and outer plates together. Other and important objects will appear from the following detailed specification considered in the light of the accompanying drawing wherein:

Fig. 1 is an outside view of the fastener according to my invention, illustrating the inner and outer plates in a clamped relation.

Fig. 2 is an inside plan view of Fig. 1.

Fig. 3 is an enlarged sectional view on the line 3—3 of Fig. 1.

Fig. 4 is an enlarged sectional view on the line 4—4 of Fig. 1.

Fig. 5 is an exploded view of the clamping fastener.

Fig. 6 is a fragmentary view of Fig. 1, however with the locked and driving slotted stud removed, and Fig. 7 is a perspective view of a removable key for rotating and driving the exposed spring illustrated in Fig. 6.

According to the invention the fastener is employed to hold and clamp a pair of superimposed inner and outer plates 10 and 11 together, and for purposes of specification plate 10 may be considered as a cover member and the fastener comprises; the offset metal spring 12, the rotatable disc 13, the fixed metal bearing or socket 14, and the driving slotted metal stud 15.

The slotted bearing 14 is hollow and fixedly anchored in any appropriate manner to the cover plate 10 from which it projects towards the inner plate 11. The bearing includes the opposed cam shaped slots 16 for receiving and straddling the intermediate rectilinear portion of the yieldable spring 12.

Rotatably mounted on a beveled annular bearing 17 of the inside plate 11 is the annular neck or rim 18 extending from the disc or driven member 13. More particularly inclined shoulder 19 of the annular neck or hub 18 of disc 13 is rotatably guided and retained against the inclined bearing 17.

Extending diametrically across the opening 20' of the rim 18 but spaced from the rotatable means or disc 13 is the intermediate rectilinear portion 32 of the spring 12 which has its ends desirably coiled and anchored to rivets 20 fixedly secured to the rotatable disc 13.

Where it is desired to removably hold and clamp the juxtapositioned plates 10 and 11 together or in marginal overlapping relation as shown the slotted stud 15 is first inserted into the hollow bushing or bearing 14. Specifically speaking shank 21 of the stud 15 is separated by the slot 22, thus defining spaced legs 23 and each of the latter embody a laterally extending terminal lip or nib portion 24.

Since the stud 15 is slotted, the legs 23 thereof are advantageously moved slightly towards each other at a time when nibs 24 enter the bore of slotted bearing 14 by reason of their resiliency and are so held as the shank 21 is progressively projected into the bore of bearing 14 until slotted head 25 of the stud 15 hits the outer stop face 26 of the closure plate 10 at which time nibs 24 automatically enter the interrupted annular bearing defined by the chamfered or inclined faces 27 at opposed inner ends of the bearing 14, that is, the spaced legs 23 of the slotted stud spread outwardly to assume their normal position at a time when nibs 24 snap into the interrupted stop bearing defined by faces 27, thus locking the stud against accidental longitudinal removal from the bearing 14 although closely and rotatably retained therein.

With the rotatable stud locked in the socket or bearing 14 as described, the diametrically disposed slot or gap 22 running substantially the entire length of the shank 21 is rotated to be in alinement with the ends of the opposed cam slots 16 of the bearing 14. This may be accomplished by manually rotating head 25 or by insertion of a suitable tool not shown in the groove 28 as is well understood. Thus assembled the bearing is now inserted into the rotatably retained neck 19 of the disc 13 whereby the substantially rectilinear portion 32 of spring 12 simultaneously enters the gap 22 of the shank 21 and the spaced cam slots 16 of the fixed socket 14. Thereafter, a screw driver or tool is utilized to rotate stud 15.

The elongated legs 23 now straddle the rectilinear portion 32 of the spring 12 and rotation of the stud 15 causes the rectilinear or straight portion 32 of this spring to be driven over the spaced cam portions 29 defined by the cam slots 16 and to the inner limits of the latter. During this action, of course disc 13 is also rotated until the straight portion of spring 12 automatically snaps into the inner limits or ends 30 of the cam slots 16.

As previously pointed out the ends of spring 12 are formed with several convolutions or coils 31 and thus the straight or rectilinear portion 32 of the spring is spaced from the rotatable disc. If therefore the stud 15 is rotated to drive rectilinear portion 32 under cams 29, these cams initially slightly deflect the rectilinear portion 32 and following such deflection the spring passes over the highest part of the cams 29 and becomes interlocked under slight tension with these cams when it reaches the ends of the cam slots 16. Thus accidental unlocking rotation of the spring and bearing 14 is precluded and in the interlocked relation of the slotted bearing and the coiled spring, the superimposed or juxtapositioned plates 10 and 11 are held clamped together and against vibration relative to one another.

In case it is desired to remove the top plate 10 from plate 11, stud 15 is actuated to rotatably drive the straight portion 32 of the spring to be clear of cams 29 at which time the cam slots 16 of the bearing 14 are in line with the gap 22 of the shank 21 of the stud. Thereafter the stud and its bearing 14 may be cleared of or removed from spring 12 when the cover plate 10 is lifted away from plate 11. And to remove the stud from bearing 14, finger pressure applied to the inner end of the shank causes the nibs to be projected into the bore of bearing 14 after which the stud may be conveniently and completely withdrawn from the latter.

Of course where the slotted stud 15 is not employed (Fig. 6) direct access is had to the rectilinear portion 32 of the spring which can be rotated or operated by utilizing the slotted shank of the removable key K (Fig. 7), that is, the latter being inserted to straddle the spring traversing the bearing 14 which as shown in all of the embodiments herein is fixedly anchored to the outer plate 10 by weld 14'. Pursuant to rotation of the spring on the part of the key either for unlocking or locking thereof with the cams of bearing 14, the key is removed as is well understood in which instant a part of the spring is always accessible and exposed whereas in case of the stud 15, if employed, characterizes closure means rotatably guided by bearing 14 which also rotatably and removably guides the shank of the winged key K.

In the removable interlocked relation of the spring and cam means where stud 15 is employed, the latter characterizes supplemental stop means to prevent accidental unlocking of the spring from the cam means and during such interlocking relation the spring also constitutes supplementary means to prevent accidental rotation of the slotted stud to preclude disengagement of the spring from the cam means.

Various changes may be made in details of construction and arrangement of parts without departing from the spirit of the invention or sacrificing any of the advantages thereof inherent therein.

I claim:

1. A fastener for removably clamping together an outer plate and an inner plate comprising a fixed bearing extending from said outer plate and having cam means, said inner plate having rotatable means including an opening for removably receiving said fixed bearing, a spring secured to said rotatable means and spaced from and arranged across said opening, and a stud rotatably retained by said bearing and having spaced means for straddling said spring to rotatably drive the latter to interlock with said cam means.

2. A fastener for removably clamping together an outer plate and an inner plate comprising a fixed bearing extending from said outer plate and having cam means, said inner plate having rotatable means including an opening for removably receiving said fixed bearing, a spring having coiled ends secured to said rotatable means and having a rectilinear portion spaced from and arranged across said opening, and a stud rotatably retained by said bearing and having spaced means for straddling said rectilinear portion to rotatably drive the latter to interlock with said cam means.

3. A fastener for removably clamping together an outer plate and an inner plate comprising a hollow bearing fixed to and extending from said outer plate and having cam means, said inner plate having rotatable means including an opening for removably receiving said fixed bearing, a spring secured to said rotatable means and offset from the latter and spaced from and arranged across said opening, and a stud rotatably retained by said bearing and having spaced means for straddling said spring to rotatably drive the latter to interlock with said cam means.

4. A fastener for removably clamping together an outer plate and an inner plate comprising a hollow bearing fixed to and extending from said outer plate and having cam means, said inner plate having rotatable means including an opening for removably receiving said fixed bearing, a spring having coiled ends secured to said rotatable means and including a rectilinear portion offset from said ends and spaced from said rotatable means and arranged across said opening, and a stud rotatably retained by said bearing and having spaced means for straddling said spring to rotatably drive the latter to removably interlock with said cam means.

5. A fastener for removably clamping together an outer plate and an inner plate comprising a hollow bearing extending from said outer plate and having arcuate slots defining cam means, said inner plate having rotatable means including an opening for removably receiving said fixed bearing, a spring secured to said rotatable means and spaced from and arranged across said opening and adapted to be removably received by said slots, and a stud rotatably retained by said bearing and having spaced means for straddling said spring when disposed in said slots to rotatably drive the intermediate portion of said spring to interlock with said cam means.

6. A fastener for removably clamping together an outer plate and an inner plate comprising a fixed bearing extending from said outer plate and having arcuate slots defining cam means, said inner plate having rotatable means including an opening for removably receiving said fixed bearing, a spring secured to said rotatable means and spaced from and arranged across said opening and adapted to be received by said slots, a stud rotatably retained by said bearing and having spaced resilient legs for straddling said spring when disposed in said slots to rotatably drive said spring to disengageably interlock with said cam means, and locking means to prevent linear displacement of said stud longitudinally of said bearing.

7. A fastener for removably clamping together an outer plate and an inner plate comprising a fixed bearing extending from said outer plate and having cam means, said inner plate having rotatable means including an opening for removably receiving said fixed bearing, a spring secured to said rotatable means and spaced from and arranged across said opening, a stud rotatably retained by said bearing and having spaced means for straddling said spring to rotatably drive the latter to interlock with said cam means, and means disengageably locking said stud to said bearing.

8. A fastener having rotatable means including an opening, a spring secured to said rotatable means and arranged across the opening, cam means fixed relative to said rotatable means, and means for rotating said spring to interlock with said cam means.

9. The fastener according to claim 8 wherein said means for rotating said spring also constitutes stop means to retain said spring interlocked with said cam means.

10. The fastener according to claim 8 characterized further in that said means for rotating said spring is prevented from accidental rotation by said spring when interlocked with said cam means and said spring is prevented from disengaging said cam means by said means for rotating said spring when interlocked with said spring.

11. A fastener for removably clamping together an outer plate and an inner plate comprising a fixed bearing extending from said outer plate and having cam means, said inner plate having rotatable means including an opening for removably receiving said fixed bearing, a spring secured to said rotatable means and spaced from and arranged across said opening, and a member rotatably guided by said bearing and having spaced means for straddling said spring to rotatably drive the latter to interlock with said cam means.

12. A fastener for removably clamping together an outer plate and an inner plate comprising a fixed bearing extending from said outer plate and having cam means, said inner plate having rotatable means including an opening for removably receiving said fixed bearing, a spring having coiled ends secured to said rotatable means and having a rectilinear portion spaced from and arranged across said opening, and a member rotatably guided by said bearing and having spaced means for straddling said rectilinear portion to rotatably driven the latter to interlock with said cam means.

13. A fastener for removably clamping together an outer plate and an inner plate comprising a hollow bearing fixed to and extending from said outer plate and having cam means, said inner plate having rotatable means including an opening for removably receiving said fixed bearing, a spring secured to said rotatable means and offset from the latter and spaced from and arranged across said opening, and a key rotatably and removably guided by said bearing and having spaced means for straddling said spring to rotatably drive the latter to interlock with said cam means.

SAMUEL SEGAL.